United States Patent
Feldtkeller

(10) Patent No.: US 9,960,693 B1
(45) Date of Patent: May 1, 2018

(54) CONTROL OF SWITCHING FREQUENCY BASED ON DIFFERENCE IN PHASE RELATIONS

(71) Applicant: Infineon Technologies Austria AG, Villach (AT)

(72) Inventor: Martin Feldtkeller, Munich (DE)

(73) Assignee: Infineon Technologies Austria AG, Villach (AT)

(*) Notice: Subject to any disclaimer, the term of this patent is extended or adjusted under 35 U.S.C. 154(b) by 0 days. days.

(21) Appl. No.: 15/336,088

(22) Filed: Oct. 27, 2016

(51) Int. Cl.
*H02M 3/335* (2006.01)
*H02M 1/00* (2006.01)

(52) U.S. Cl.
CPC ......... *H02M 3/33523* (2013.01); *H02M 2001/0058* (2013.01); *Y02B 70/1475* (2013.01)

(58) Field of Classification Search
CPC .......... H02M 2001/0058; H02M 3/335–3/342; Y02B 70/1475
See application file for complete search history.

(56) References Cited

U.S. PATENT DOCUMENTS

| 4,277,728 A * | 7/1981 | Stevens ............... H02J 9/062 315/194 |
| 5,880,944 A * | 3/1999 | Hickman ............. H02M 3/28 363/17 |
| 8,749,209 B2 | 6/2014 | Feldtkeller |
| 2014/0146574 A1* | 5/2014 | Worek ............... H02M 3/3376 363/17 |

OTHER PUBLICATIONS

Fei, "Microcontroller (MCU) Based Simplified Optimal Trajectory Control (SOTC) for High-Frequency LLC Resonant Converters," May 1, 2015, 107 pp. (uploaded in parts).
"Resonant LLC Converter: Operation and Design," Infineon; Application Note AN 2012-09; V.1.0; Sep. 2012; 19 p p.
Yang, "LLC Resonant Converter," Chapter 4, pp. 94-141, Topology Investigation for Front End DC/DC Power Conversion for Distributed Power System, (dissertation submitted to the Faculty of Virginia Polytechnic Institute and State University, Sep. 12, 2003.
Ding, "Design of Resonant Half-Bridge converter using IRS2795(1,2) Control IC," Application Note AN-1160; www.irf.com; 32 pp.

(Continued)

*Primary Examiner* — Gary L Laxton
*Assistant Examiner* — Peter Novak
(74) *Attorney, Agent, or Firm* — Shumaker & Sieffert, P.A.

(57) ABSTRACT

In some examples, a method of controlling a first switch and a second switch of a resonant mode power converter circuit, the method comprising delivering control signals to the first switch and the second switch at a switching frequency. The method also comprises determining, for a first driving period, a first phase relation between a phase of a resonant current in the resonant mode power converter circuit and a phase of the control signals. The method further comprises determining, for a second driving period, a second phase relation between a phase of the resonant current and a phase of the control signals, and controlling the switching frequency based on a difference of the first phase relation and the second phase relation.

20 Claims, 11 Drawing Sheets

(56) References Cited

OTHER PUBLICATIONS

"An introduction to LLC resonant half-bridge converter," AN2644; Application Note; Sep. 2008, 64 pp.
Mammano, et al., "Resonant Mode Converter Topologies," Unitrode Corporation, 2001, 14 pp. (Applicant points out, in accordance with MPEP 609.04(a), that the year of publication, 2001, is sufficiently earlier than the effective U.S. filing date, Oct. 27, 2016, so that the particular month of publication is not in issue.)
Oruganti, "State-Plane Analysis of Resonant Converters," PhD Dissertation, Jan. 1987, 533 pp. (uploaded in parts).
Feng, "State-Trajectory Analysis and Control of LLC Resonant Converters," PhD dissertation, Virginia Polytechnic Institute and State University, Mar. 29, 2013, 217 pp.
Fei, et al., "State-Trajectory Control of LLC converter Implemented by Microcontroller," PMC review; Jun. 18, 2013, 8 pp.
Wang, et al., "Analysis and implementation of LLC burst mode for light load efficiency improvement," In Proc. IEEE APEC, Feb. 2009, pp. 58-64.
Feng, et al., "A universal adaptive driving scheme for synchronous rectification in LLC resonant converters," Power Electronics, IEEE Transactions on 27; No. 8; Aug. 2012; 3775-3781.
Feng, et al., "Optimal Trajectory Control of LLC Resonant Converters for Soft Start-Up," Power Electronics, IEEE Transactions, Mar. 2014; pp. 1461-1468.
Feng, et al., "Optimal Trajectory Control of Burst Mode for LLC Resonant Converter," IEEE Transactions on Power Electronics, vol. 28, No. 1, Jan. 2013, pp. 457-466.

* cited by examiner

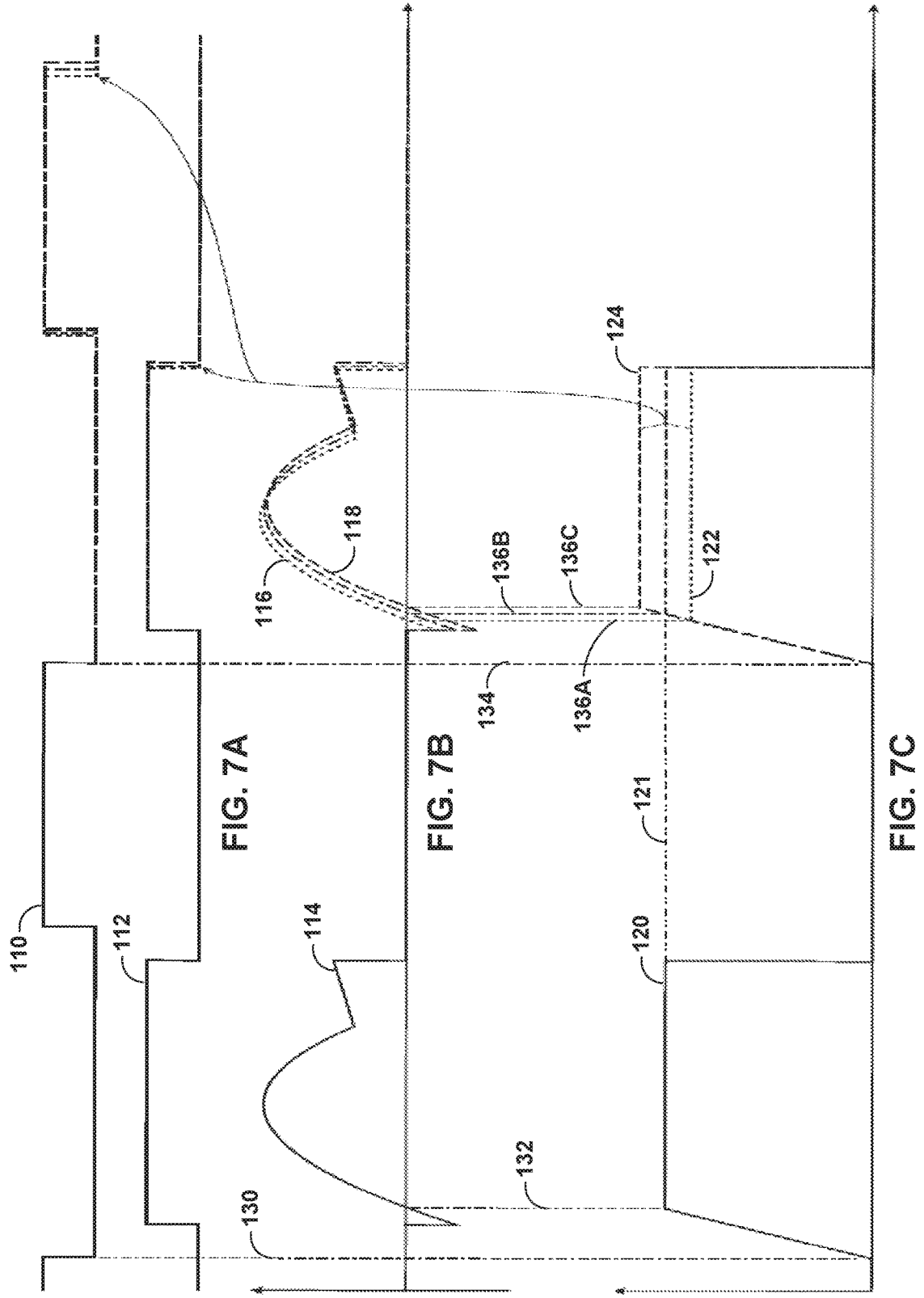

US 9,960,693 B1

CONTROL OF SWITCHING FREQUENCY BASED ON DIFFERENCE IN PHASE RELATIONS

TECHNICAL FIELD

This disclosure relates to resonant mode power converters, such as LLC (inductor-inductor-capacitor) power converter circuits.

BACKGROUND

A resonant mode power converter circuit may include a half-bridge circuit with two switches. A controller device for the resonant mode power converter circuit may switch the two switches at a switching frequency based on an output voltage of the resonant mode power converter circuit. To increase the output voltage, the controller device may decrease the switching frequency, and to decrease the output voltage, the controller device may increase the switching frequency.

SUMMARY

This disclosure describes techniques for controlling the switching frequency of a resonant mode power converter circuit using the phase relation between the resonant current and the control signals delivered to the switches of a half-bridge circuit. A controller device of the resonant mode power converter circuit may determine whether the phase relation is increasing, decreasing, or staying the same. Based on the difference between phase relations for two driving periods, the controller device may adjust the switching frequency.

In some examples, this disclosure describes a method of controlling a first switch and a second switch of a resonant mode power converter circuit, the method comprising delivering control signals to the first switch and the second switch at a switching frequency. The method also comprises determining, for a first driving period, a first phase relation between a phase of a resonant current in the resonant mode power converter circuit and a phase of the control signals. The method further comprises determining, for a second driving period, a second phase relation between a phase of the resonant current and a phase of the control signals, and controlling the switching frequency based on a difference of the first phase relation and the second phase relation.

In some examples, this disclosure describes a controller device for controlling a first switch and a second switch of a resonant mode power converter circuit, the controller device comprising at least two control pins configured to deliver control signals to the first switch and the second switch at a switching frequency; and a sensing pin configured to sense a resonant current in the resonant mode power converter circuit. The controller device further includes processing circuitry configured to determine, for a first driving period, a first phase relation between a phase of the resonant current and a phase of the control signals, determine, for a second driving period, a second phase relation between a phase of the resonant current and a phase of the control signals, and control the switching frequency based on a difference of the first phase relation and the second phase relation.

In some examples, this disclosure describes a resonant mode power converter circuit comprising a half-bridge circuit including a first switch, a second switch, and an output node electrically connected to a load terminal of the first switch and a load terminal of the second switch; an LLC circuit including an inductor electrically connected to the output node of the half-bridge circuit, a primary side of a transformer electrically connected to the inductor, and a resonant capacitor electrically connected to the primary side of the transformer; and an output capacitor arranged to receive an output voltage from a secondary side of the transformer. The resonant mode power converter circuit further includes a controller device including driver circuitry configured to deliver control signals to the first switch and the second switch at a switching frequency, and processing circuitry configured to determine, for a first driving period, a first phase relation between a phase of a resonant current in the LLC circuit and a phase of the control signals, determine, for a second driving period, a second phase relation between a phase of the resonant current and a phase of the control signals, and control the switching frequency based on a difference of the first phase relation and the second phase relation.

The details of one or more examples are set forth in the accompanying drawings and the description below. Other features, objects, and advantages will be apparent from the description and drawings, and from the claims.

BRIEF DESCRIPTION OF DRAWINGS

FIGS. 7A-7C are graphs of control signals, the resonant current through a tank circuit, and an output of a ramp generator, in accordance with some examples of this disclosure.

DETAILED DESCRIPTION

A resonant mode power converter circuit may convert an input voltage to an output voltage to power or drive an output load. The maintain a stable output voltage, a controller device may deliver control signals at a variable switching frequency to switches in a half-bridge circuit of the resonant mode power converter circuit. The controller device may adjust the switching frequency in response to changes in the input voltage and/or changes in the impedance of the output load.

To determine the switching frequency, a controller device may monitor the phase relation between a phase of the control signals and a phase of a resonant current in the resonant mode power converter circuit. The controller device may adjust the switching frequency based on differences in the phase relation that occur over time. For example, the phase relation includes a phase lag, wherein a phase of the resonant current lags behind a phase of the control signals. If the phase lag increases over time, potentially foreshadowing first a decrease of an amplitude of the resonant current and next a decrease in the output voltage, the controller device may decrease the switching frequency to increase first the amplitude of the resonant current and next the output voltage. In some examples, by monitoring the phase relation, the controller device may have a higher control loop gain and react more quickly to changes in the input voltage and/or changes in the impedance of the output load, as compared to a controller device that monitors only the output voltage.

Figure 1:
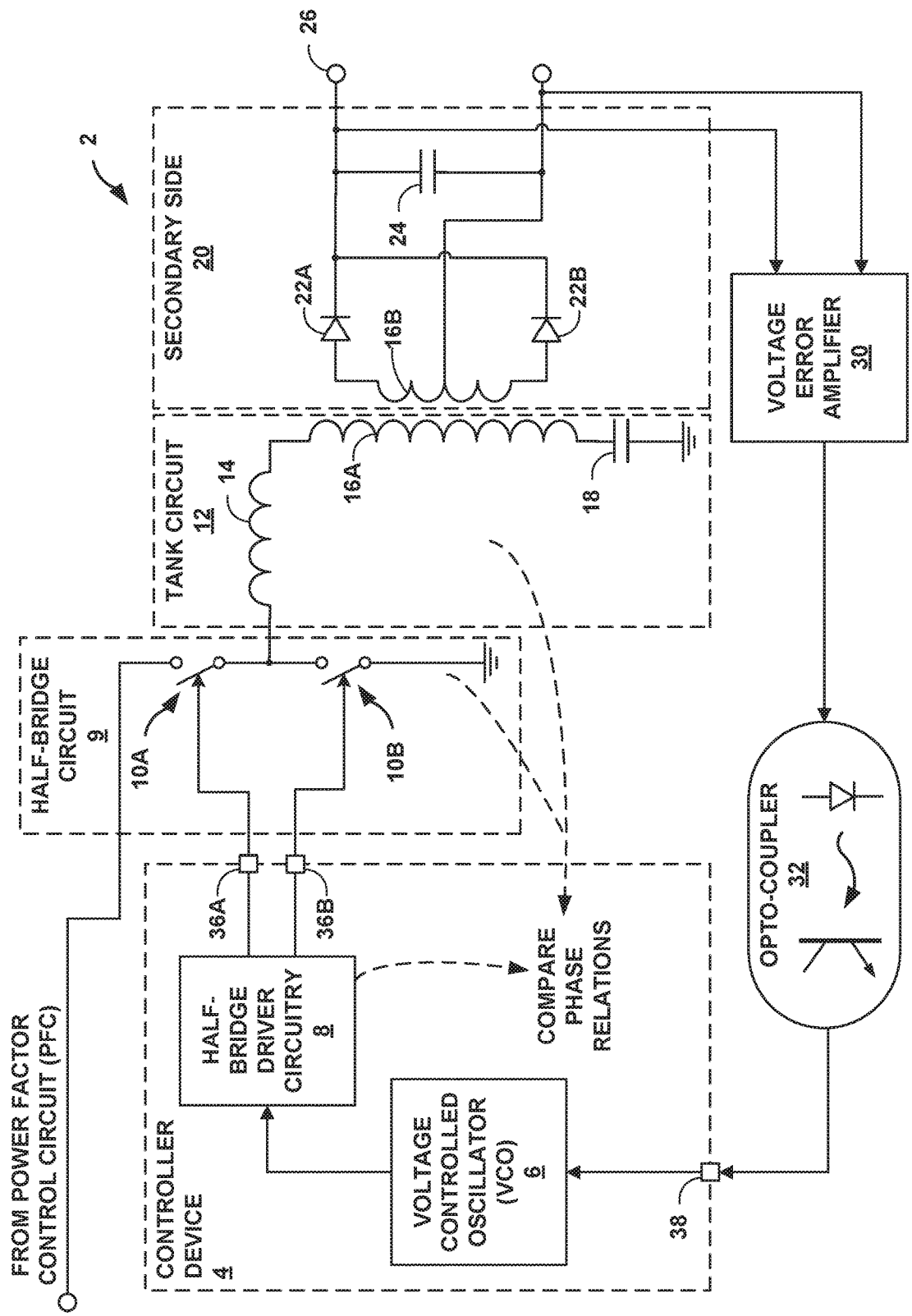
FIG. 1 is a conceptual block and circuit diagram of a resonant mode power converter circuit including a controller device, in accordance with some examples of this disclosure.

FIG. 1 is a conceptual block and circuit diagram of a resonant mode power converter circuit 2 including a controller device 4, in accordance with some examples of this disclosure. Resonant mode power converter circuit 2 may be configured to receive an input voltage from a power factor control circuit (PFC) and deliver an output voltage to a load at output node 26. In some examples, resonant mode power converter circuit 2 may convert a direct-current (DC) input voltage to a DC output voltage with high power efficiency. Resonant mode power converter circuit 2 may include controller device 4, half-bridge circuit 9, tank circuit 12, secondary side 20, and a feedback loop including voltage error amplifier 30 and opto-coupler 32.

Controller device 4 in resonant mode power converter circuit 2 may be configured to control the operation of half-bridge circuit 9 through control pins 36A, 36B. Control pins 36A, 36B may be configured to deliver control signals to the control terminals of switches 10A, 10B of half-bridge circuit 9. Each of switches 10A, 10B may conduct electricity based on the voltage at the control terminal of the switch. The control terminal of each switch may include a gate terminal for a field-effect transistor (FET) or an insulated gate bipolar transistor (IGBT).

Controller device 4 may include processing circuitry configured to determine a switching frequency for the control signals delivered by control pins 36A, 36B. In some examples, the processing circuitry of controller device 4 may include fixed logical blocks and fixed arithmetic blocks. The processing circuitry of controller device 4 may include programmable logic blocks so that a user can modify the variables and thresholds by which the processing circuitry determines the switching frequency. The processing circuitry may include voltage-controlled oscillator (VCO) 6, which may generate an oscillating signal at a frequency that is based on a voltage received from feedback pin 38. Half-bridge driver circuitry 8 may receive the oscillating signal from VCO 6 and generate control signals at a switching frequency that is based on the frequency of the oscillating signal from VCO 6.

Control pins 36A, 36B may be configured to deliver control signals to cause one of switches 10A, 10B to conduct electricity while the other of switches 10A, 10B does not conduct electricity. The control signals may include dead time during which neither of control pins 36A, 36B delivers an enabling control signal and neither of switches 10A, 10B conducts electricity. One switching cycle or switching period for control pins 36A, 36B may include control pin 36A delivering a first enabling control signal, control pin 36B delivering a second enabling control signal, and dead time between the enabling control signals. The control signals may include square waves with a high-side period and a low-side period for each switching cycle. In some examples, "control signal" may refer to the entire switching period and/or the only the enabling period of signal delivered by one of control pins 36A, 36B. The enabling period of a control signal may be the period of time during which the control signal enables the respective switch of switches 10A, 10B to conduct electricity. The enabling period may include a high-side period for an n-channel switch, and a low-side period for a p-channel switch. In some examples, switches 10A, 10B may include two n-channel switches. Due to dead time, the enabling period of each control signal may be slightly less than fifty percent of the switching cycle.

Half-bridge circuit 9 may include high-side switch 10A and low-side switch 10B. When control pin 36A delivers an enabling control signal to switch 10A, switch 10A may conduct electricity from the input node of resonant mode power converter circuit 2 to the output node of half-bridge circuit 9. As a result, the voltage at the output node of half-bridge circuit 9 may increase and cause the resonant current in resonant inductor 14 to increase. When control pin 36B delivers an enabling control signal to switch 10B, switch 10B may conduct electricity from the output node of half-bridge circuit 9 to reference ground. The voltage at the output node of half-bridge circuit 9 may decrease and cause the resonant current in resonant inductor 14 to decrease. For purposes of this disclosure, a positive resonant current in resonant inductor 14 may mean that conventional current (i.e., positively charged carriers) is flowing through resonant inductor 14 towards primary side 16A of the transformer.

Switches 10A, 10B may include, but are not limited to, any type of FET, a bipolar junction transistor (BJT), an IGBT, a high-electron-mobility transistor (HEMT), a gallium-nitride (GaN) or silicon-carbide (SiC) based transistor, or another element that uses voltage for its control. Switches 10A, 10B may include n-type transistors or p-type transistors, and switches 10A, 10B may include vertical power transistors. For a vertical power transistor, the source (or emitter) terminal and the drain (or collector) terminal may be on opposite sides or opposite surfaces of the transistor or semiconductor switch. Current in a vertical power transistor may flow through the transistor from top to bottom or from bottom to top. In some examples, switches 10A, 10B may include lateral transistors or horizontal transistors that may offer certain benefits such as ease of fabrication and cost. In some examples, switches 10A, 10B may include other analog devices such as diodes. Switches 10A, 10B may also include freewheeling diodes connected in parallel with switches 10A, 10B to prevent reverse breakdown of the switches.

Switches 10A, 10B may include three terminals: two load terminals and at least one control terminal. For MOSFET switches, switches 10A, 10B may include a drain terminal, a source terminal, and a gate terminal. For IGBT switches, switches 10A, 10B may include a collector terminal, an emitter terminal, and a gate terminal. Switches 10A, 10B may conduct electricity between load terminals (i.e., drain and source), based on the voltage delivered to the control terminal (i.e., gate) by one of control pins 36A, 36B.

Switches 10A, 10B may include various material compounds, such as silicon (Si), silicon carbide (SIC), Gallium Nitride (GaN), or any other combination of one or more semiconductor materials. To take advantage of higher power density requirements in some circuits, power converters may operate at higher frequencies. In some examples, SIC switches may experience lower switching power losses. Improvements in magnetics and faster switching, such as Gallium Nitride (GaN) switches, may support higher frequency converters. These higher frequency circuits may require control signals to be sent with more precise timing, as compared to lower-frequency circuits.

Tank circuit 12 may include resonant inductor 14, primary side 16A of the transformer, and resonant capacitor 18. Resonant inductor 14 may impede changes in the resonant current through tank circuit 12, and resonant capacitor 18 may impede a DC resonant current through tank circuit 12. Primary side 16A may be magnetically coupled to secondary side 16B of the transformer and provide galvanic isolation between the input node of resonant mode power converter circuit 2 and output node 26. Resonant inductor 14 may be integrated in the transformer by loose magnetic coupling.

Secondary side 20 of resonant mode power converter circuit 2 may include diodes 22A, 22B to ensure that the output voltage at output node 26 remains a positive voltage. Diodes 22A, 22B may allow positive currents from secondary side 16B of the transformer to pass to output node 26. Diodes 22A, 22B may operate as a rectifier convert negative voltages at secondary side 16B to positive voltages. Output capacitor 24 may reduce any fluctuations in the output voltage. An output load (not shown in FIG. 1) may be connected to output node 26. The output load may include an electrical load such as a light source, an electronic device, or any other suitable electrical load. The output load may be static or variable.

Voltage error amplifier 30 may be electrically connected to output node 26. Voltage error amplifier 30 may be configured to generate an amplified signal based on a difference between the output voltage and a reference voltage. Opto-coupler 32 may receive the amplified signal from voltage error amplifier 30. Opto-coupler 32 may be configured to provide galvanic isolation between output node 26 and feedback pin 38 of controller device 4. Controller device 4 may further include feedback pin 38 that may be configured to receive a coupled signal from opto-coupler 32. Controller device 4 may adjust the switching frequency of the control signals delivered by control pins 36A, 36B based on the signal received at feedback pin 38.

In accordance with the techniques of this disclosure, controller device 4 may be configured to monitor the phase of the resonant current relative to the phase of the control signals delivered by control pins 36A, 36B. For a first driving period and a second driving period, the processing circuitry of controller device 4 may determine a phase relation between a phase of the resonant current and a phase of the control signals. The phase relation may include the amount of time that passes between the end of an enabling control signal and the zero crossing of the resonant current. Controller device 4 may control and/or adjust the switching frequency based on a difference of the phase relation in two driving periods. For purposes of this disclosure, a driving period may include a switching period or the time period between the falling edge of a control signal delivered to one switch and the falling edge of the control signal delivered to the other switch, which may be approximately half of a switching period.

Differences in the phase relation between a phase of the control signals and a phase of the resonant current from a first driving period to a second driving period may reflect a change in the input voltage or a change in the output load. Thus, a difference in the phase relation may indicate a change in the output voltage. In some examples, a difference in the phase relation may be a leading indicator or a predictor of a future change in the output voltage. Thus, controller device 4 that includes the ability to determine and compare phase relations may predict or respond more quickly to changes in the output voltage, as compared to other controller devices that lack the ability to determine and compare phase relations. Controller device 4 may loosen the design considerations for resonant mode power converter circuit 2 by responding to changes in the output load more quickly than other controller devices. In particular, output capacitor 24 may be designed smaller because of the responsiveness of controller 4 to changes in the output load, thereby potentially saving space and lowering cost. Moreover, the gain of the control loop may be designed higher for controller device 4, as compared to other controller devices.

Figure 2:
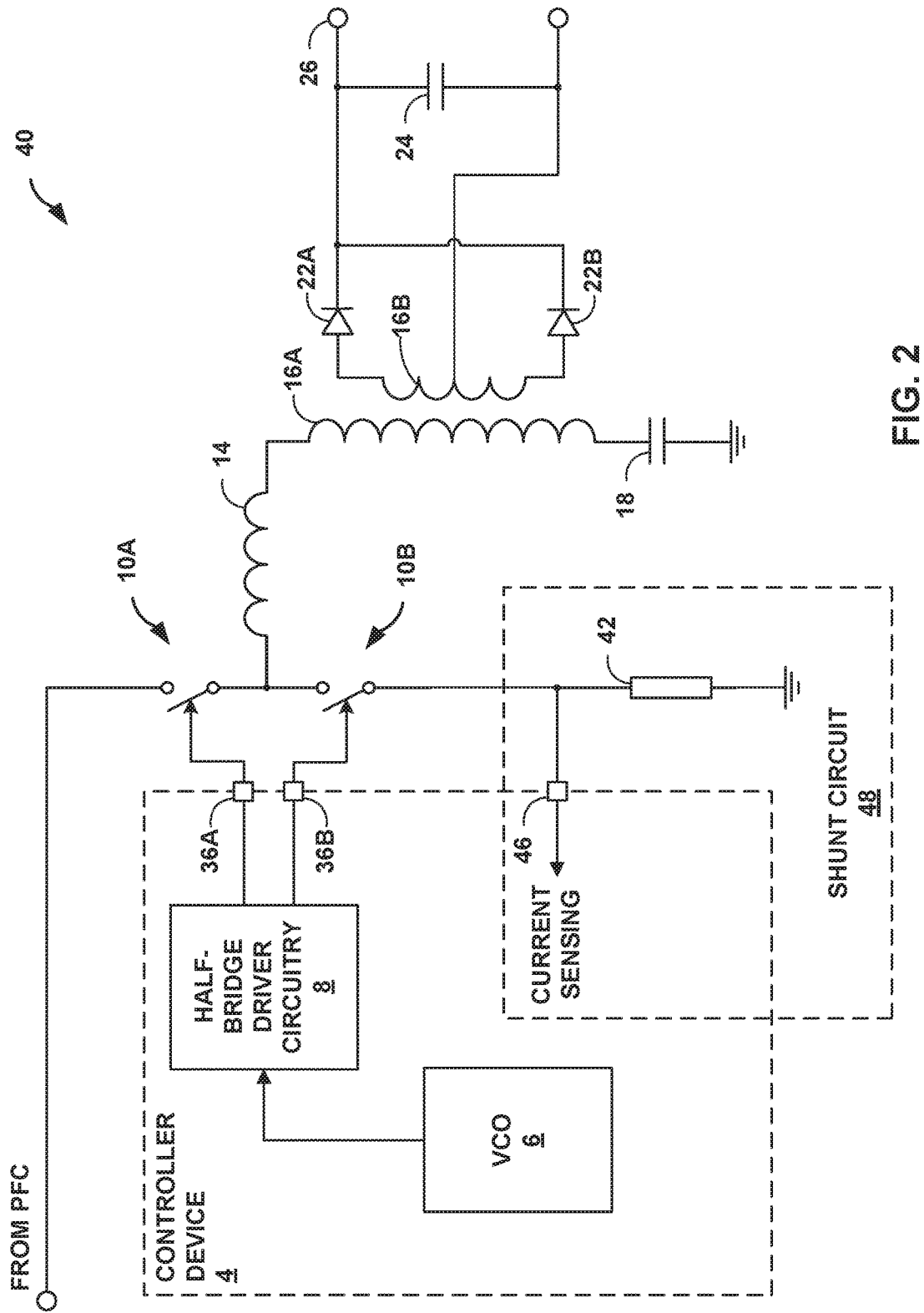
FIG. 2 is a conceptual block and circuit diagram of a controller device for a resonant mode power converter circuit including a sensing pin configured to measure a resonant current in series with a load terminal of a switch.

FIG. 2 is a conceptual block and circuit diagram of a controller device 4 for a resonant mode power converter circuit 40 including a sensing pin 46 configured to measure a resonant current in series with a load terminal of a switch 10B. Resonant mode power converter circuit 40 may include many of the same or similar components as resonant mode power converter circuit 2, including switches 10A, 10B of half-bridge circuit 9, resonant inductor 14 and resonant capacitor 18 of tank circuit 12, primary side 16A and secondary side 16B of the transformer, and diodes 22A, 22B and output capacitor 24 of secondary side 20. FIG. 2 omits voltage error amplifier 30 and opto-coupler 32, but resonant mode power converter circuit 40 may also include these components in some examples.

Resonant mode power converter circuit 40 may include shunt circuit 48, which may include shunt resistor 42 and sensing pin 46. Shunt circuit 48 may allow controller device 4 to sense or monitor a phase of the resonant current in tank circuit 12. Shunt circuit 48 may allow controller device 4 to monitor the resonant current during an on-period of switch 10B. Sensing pin 46 may be connected in series with switch 10B to monitor the current through switch 10B, which may be approximately equal to the resonant current during an on-period of switch 10B. During an off-period of switch 10B, there may be zero voltage drop and zero current across shunt resistor 42. As a result, shunt circuit 48 may allow controller device 4 to monitor the resonant current beginning at a turn-on signal delivered to switch 10B and ending at a turn-off signal delivered to switch 10B. The time period between the turn-off signal delivered to one switch and the turn-off signal delivered to the other switch may be referred to as a driving period.

The phase of the resonant current in tank circuit 12 may include the resonant current passing a threshold level such as zero amperes. The resonant current may pass zero amperes as the resonant current reverses direction. In some examples, the resonant current may reverse direction after switch 10B turns on, creating a low voltage at the output node of half-bridge circuit 9, and resonant capacitor 18 discharges.

Sensing pin 46 may monitor the resonant current by sensing the voltage across resistor 42. Controller device 4 may sense a phase of the resonant current by detecting when the voltage at sensing pin 46 crosses a threshold level. The voltage across resistor 42 may relate to the resonant current through Ohm's Law. The bottom side of shunt resistor 42, as depicted in FIG. 2, may be connected to a reference voltage such as reference ground. In some examples, shunt resistor 42 may be inside controller device 4, and shunt resistor 42 may include multiple resistors or other components. Controller device 4 may include a reference voltage pin to allow a comparison between the voltage at sensing pin 46 and the reference voltage.

Figure 3:
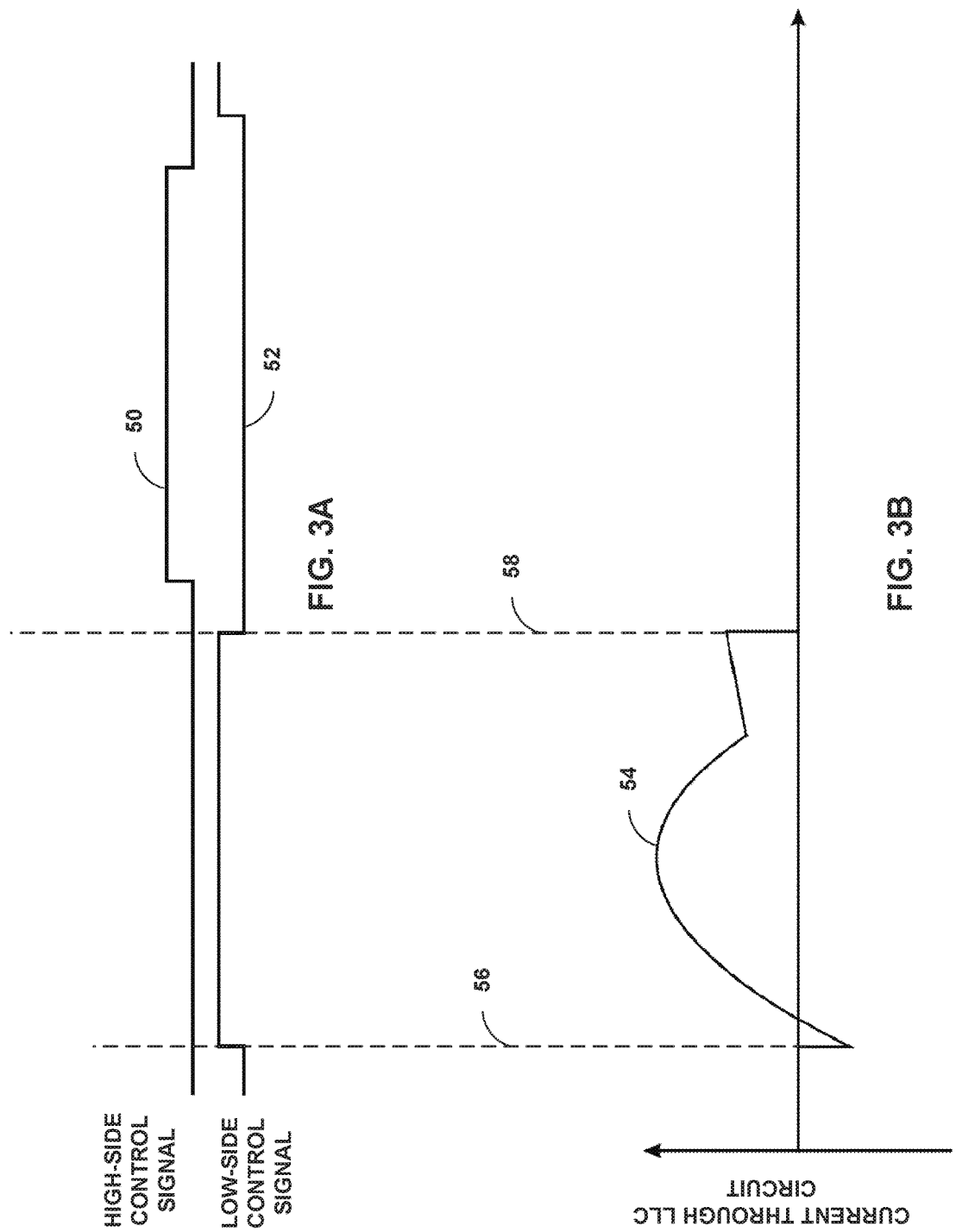
FIGS. 3A-3B are graphs of control signals and the resonant current through a tank circuit.

FIGS. 3A-3B are graphs of control signals 50, 52 and the resonant current 54 through a tank circuit 12. The graphs in FIGS. 3A-3B may correspond to resonant mode power converter circuit 40 in FIG. 2. The horizontal axes of the graphs in FIGS. 3A-3B may represent time. The vertical axes of the graphs in FIG. 3A may represent the voltage of the control signals delivered by control pins 36A, 36B. The vertical axis of the graph in FIG. 3B may represent a portion of the resonant current in tank circuit 12 that is seen by sensing pin 46 when switch 10B is closed, which may be a function of the voltage across shunt resistor 42 in shunt circuit 48, as depicted in FIG. 2.

As depicted in FIG. 3A, high-side control signal 50 may represent the control signal delivered by control pin 36A to switch 10A. Low-side control signal 52 may represent the control signal delivered by control pin 36B to switch 10B. At time 56, low-side control signal 52 may turn on, and at time 58, low-side control signal 52 may turn off. Thus, the turn-on control signal delivered to switch 10B may refer to the rising edge of low-side control signal 52 at time 56. The turn-off control signal delivered to switch 10B may refer to the falling edge of low-side control signal 52 at time 58. The enabling period of low-side control signal 52 may include the time between time 56 and time 58. The period between two enabling control signals, during which neither of switches 10A, 10B, may be referred to as dead time.

As depicted in FIG. 3B, sensing pin 46 of controller device 4 may begin monitoring resonant current 54 at time 56 and finish monitoring resonant current 54 at time 58. In some examples, the window during which sensing pin 46 monitors resonant current 54 may be different than the window depicted in FIG. 3B, due to factors such as current flowing through a reverse-conducting diode connected in parallel with switch 10B. The window between a falling edge of control signal 50 just before time 56 and the falling edge of control signal 52 at time 58 may be referred to as a driving period. At the beginning of the driving period depicted in FIG. 3B, resonant current 54 may be negative because resonant inductor 14 may maintain resonant current 54 that was flowing during the enabling period of switch 10A. A negative resonant current 54 in the example of FIG. 3B may mean that the voltage at sensing pin 46 is less than the reference voltage. Thus, negative resonant current 54 in FIG. 3B means that conventional current is flowing from shunt resistor 42 to switch 10B, as depicted in FIG. 2.

After time 56, resonant current 54 may increase. At some time after time 56, resonant current 54 may cross zero amperes and begin flowing from switch 10B to shunt resistor 42. Zero amperes may be a threshold level for resonant current 54, and controller device 4 may determine the zero crossing of resonant current 54 by comparing the voltage at sensing pin 46 to the reference voltage. In some examples, the threshold level may not exactly be zero amperes, but may instead be approximately zero amperes, which may vary by up to ten percent of a maximum expected resonant current amplitude, as measured from zero amperes. The phase of resonant current 54 may include the zero crossing of resonant current 54. After passing zero amperes, resonant current 54 may remain positive until time 58, further discharging resonant capacitor 18. After time 58, sensing pin 46 may not monitor resonant current 54 until the next rising edge of low-side control signal 52, except that current may flow through a reverse conducting diode in parallel with switch 10B.

Figure 4:
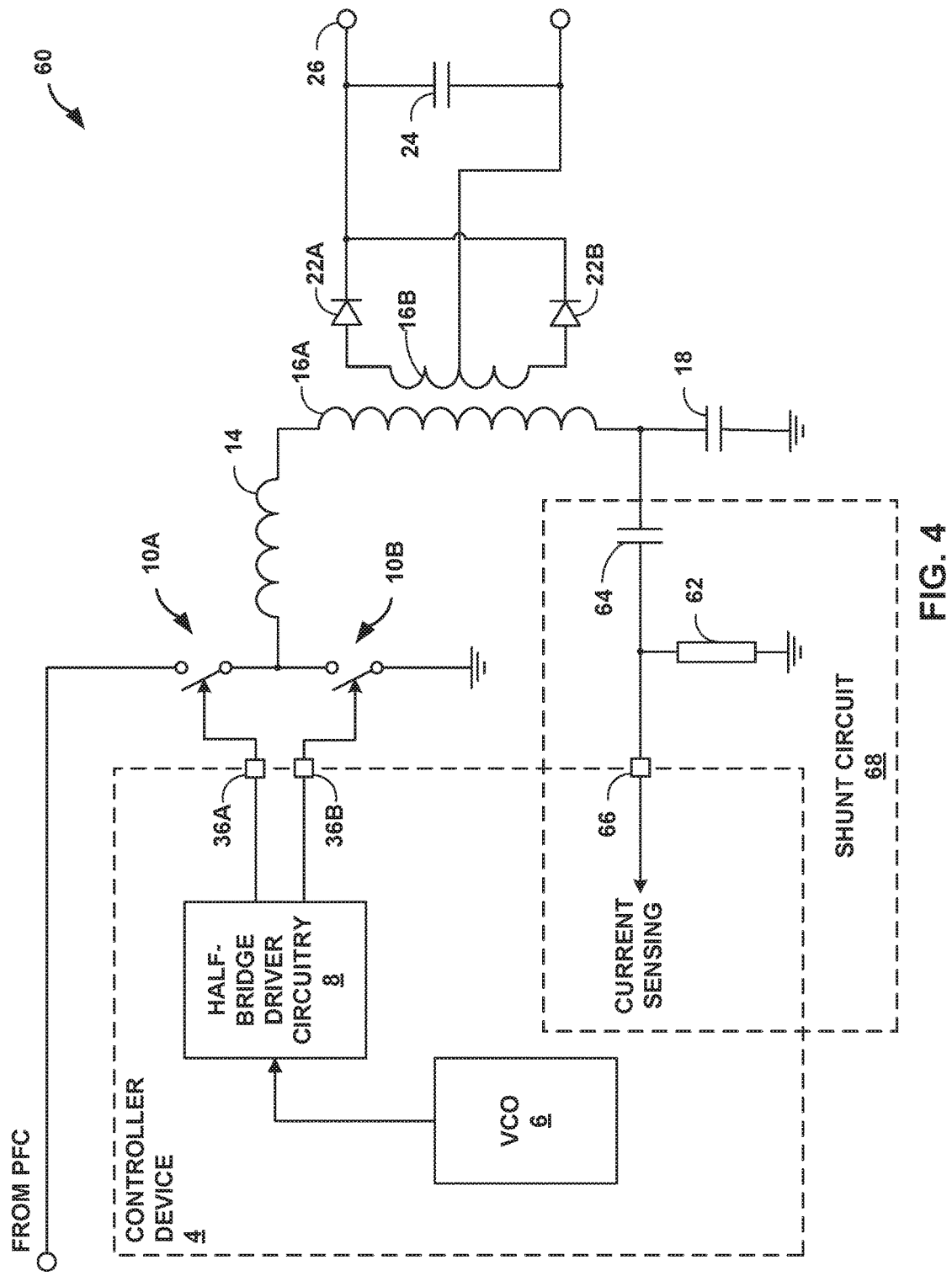
FIG. 4 is a conceptual block and circuit diagram of a controller device for a resonant mode power converter circuit including a sensing pin configured to measure a resonant current in parallel with a resonant capacitor.

FIG. 4 is a conceptual block and circuit diagram of a controller device 4 for a resonant mode power converter circuit 60 including a sensing pin 66 configured to measure a resonant current in parallel with a resonant capacitor 18. Resonant mode power converter circuit 60 may include many of the same or similar components as resonant mode power converter circuit 2 and resonant mode power converter circuit 40, including switches 10A, 10B of half-bridge circuit 9, resonant inductor 14 and resonant capacitor 18 of tank circuit 12, primary side 16A and secondary side 16B of the transformer, and diodes 22A, 22B and output capacitor 24 of secondary side 20. FIG. 4 omits voltage error amplifier 30 and opto-coupler 32, but resonant mode power converter circuit 60 may also include these components in some examples.

Resonant mode power converter circuit 60 may include shunt circuit 68, which may include shunt resistor 62, capacitor 64, and sensing pin 66. Shunt circuit 68 may allow controller device 4 to sense or monitor a phase of the resonant current in tank circuit 12. Shunt circuit 68 may allow controller device 4 to monitor the resonant current during a full switching period of switches 10A, 10B. Sensing pin 66 may be connected in parallel with resonant capacitor 18 to monitor the current through resonant capacitor 18. In some examples, sensing pin 66 may be connected in series with resonant capacitor 18 to monitor the current through resonant capacitor 18.

Sensing pin 66 may monitor the resonant current by sensing the voltage across resonant capacitor 18. Capacitor 64 may function as a current divider to direct some of the resonant current to shunt resistor 62. In some examples, capacitor 64 may be sized to direct a small amount of the resonant current to shunt resistor 62. Controller device 4 may sense a phase of the resonant current by detecting when the voltage at sensing pin 66 crosses a threshold level, such as the reference voltage. The voltage across resistor 62 may relate to the resonant current through Ohm's Law. The bottom side of shunt resistor 62, as depicted in FIG. 4, may be connected to the reference voltage. In some examples, shunt resistor 62 may be inside controller device 4, and shunt resistor 62 may include multiple resistors or other components.

Figure 5:
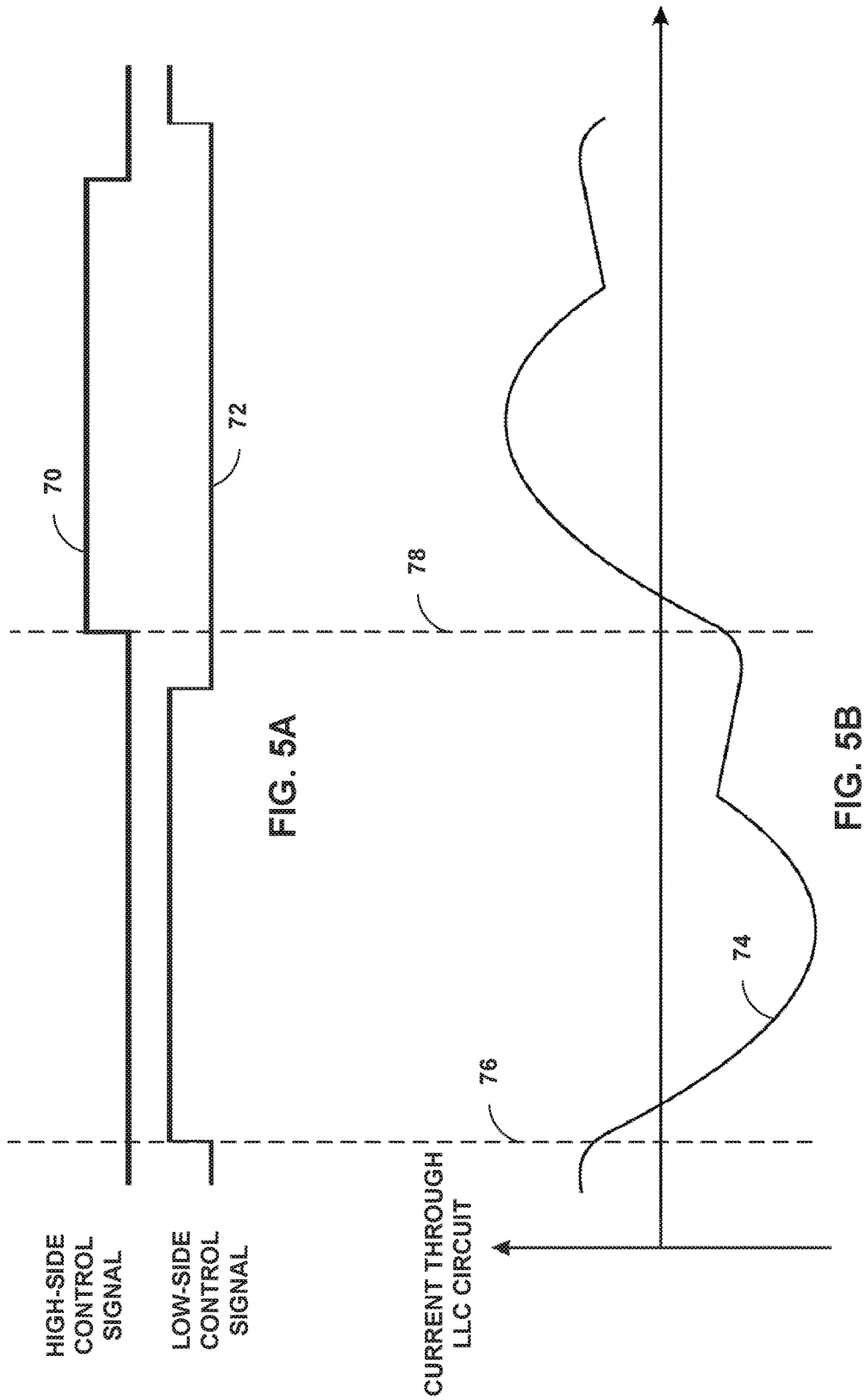
FIGS. 5A-5B are graphs of control signals and the resonant current through a tank circuit.

FIGS. 5A-5B are graphs of control signals 70, 72 and the resonant current 74 through a tank circuit 12. The graphs in FIGS. 5A-5B may correspond to resonant mode power converter circuit 60 in FIG. 4. The horizontal axes of the graphs in FIGS. 5A-5B may represent time. The vertical axes of the graphs in FIG. 5A may represent the voltage of the control signals delivered by control pins 36A, 36B. The vertical axis of the graph in FIG. 5B may represent the voltage across shunt resistor 62 in shunt circuit 68 as depicted in FIG. 4, which may be a function of the resonant current in tank circuit 12.

As depicted in FIG. 5A, high-side control signal 70 may represent the control signal delivered by control pin 36A to switch 10A. Low-side control signal 72 may represent the control signal delivered by control pin 36B to switch 10B. At time 76, low-side control signal 72 may turn on, and at time 78, high-side control signal 72 may turn on. Thus, the turn-on control signal delivered to switch 10B may refer to the rising edge of low-side control signal 72 at time 76. The turn-off control signal delivered to switch 10B may refer to the falling edge of low-side control signal 72. The turn-on control signal delivered to switch 10A may refer to the rising edge of high-side control signal 70 at time 78. The enabling period of low-side control signal 72 may include the time between time 76 and the falling edge of low-side control signal 72 just before time 78.

As depicted in FIG. 5B, sensing pin 66 of controller device 4 may monitor resonant current 74 for the entire switching period. The window between a falling edge of control signal 70 and a falling edge of control signal 72 may be referred to as a driving period because the falling edges of control signals 70, 72 may be based on signals generated by VCO 6. Alternatively, the full switching period, such as between a falling edge of low-side control signal 72 and the next falling edge of low-side control signal 72, may be referred to as a driving period. Just after time 76, resonant current 74 may be positive because resonant inductor 14 may maintain resonant current 74 that was flowing during the enabling period of switch 10A. A positive resonant current 74 in the example of FIG. 5B may mean that the voltage at sensing pin 66 is greater than the reference voltage. Thus, positive resonant current 74 in FIG. 5B means that conventional current is flowing from primary side 16A of the transformer to resonant capacitor 18, as depicted in FIG. 4.

After time 76, resonant current 74 may decrease. At some time after time 76, resonant current 74 may cross zero amperes and begin flowing from resonant capacitor 18 to primary side 16A of the transformer. Zero amperes may be a threshold level for resonant current 74, and controller device 4 may determine the zero crossing of resonant current 74 by comparing the voltage at sensing pin 66 to the reference voltage. The phase of resonant current 74 may include the zero crossing of resonant current 74. After passing zero amperes, resonant current 74 may remain negative until time 78, discharging resonant capacitor 18.

Figure 6:
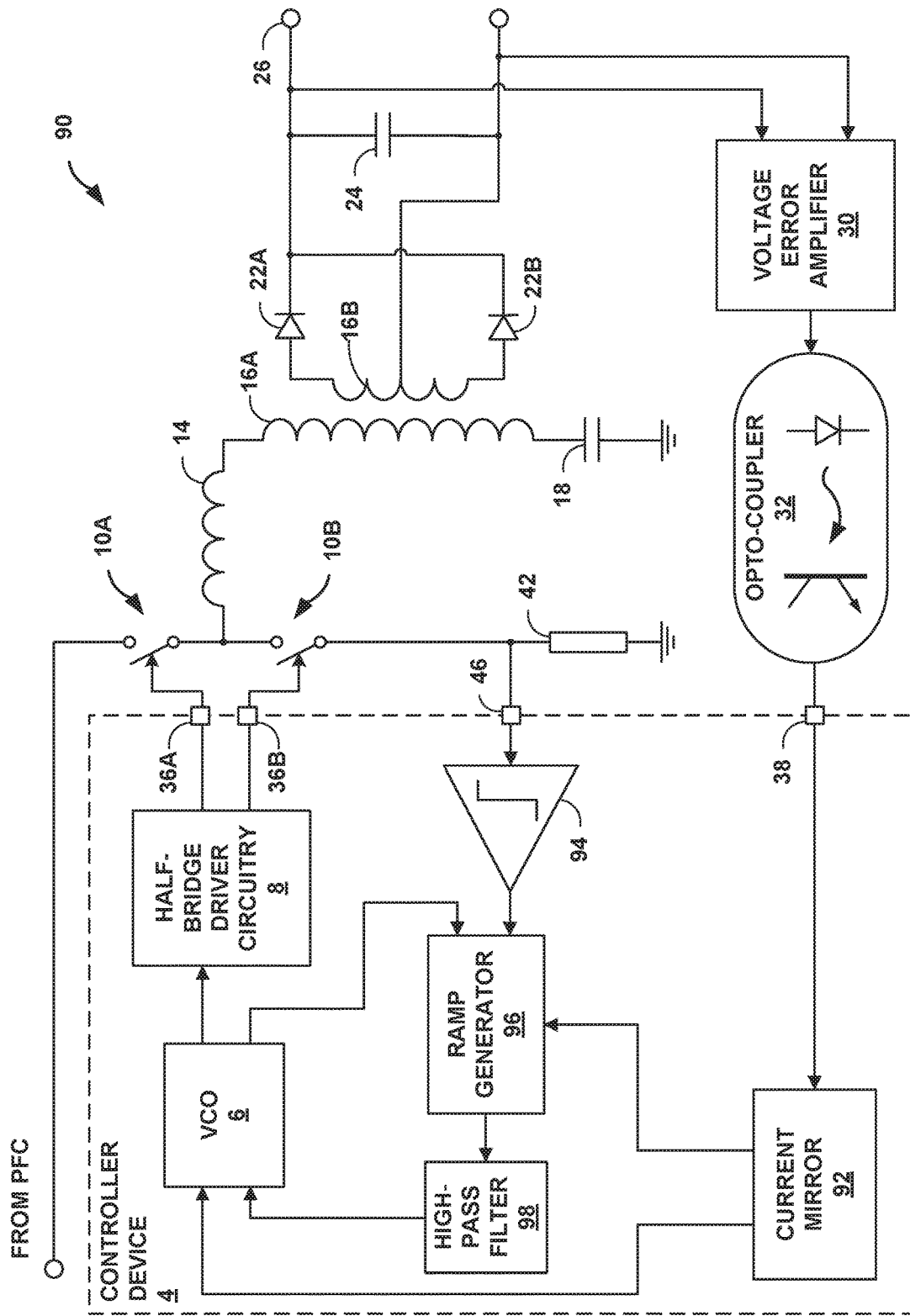
FIG. 6 is a conceptual block and circuit diagram of a controller device for a resonant mode power converter circuit including a comparator and a ramp generator, in accordance with some examples of this disclosure.
Figure 8A:
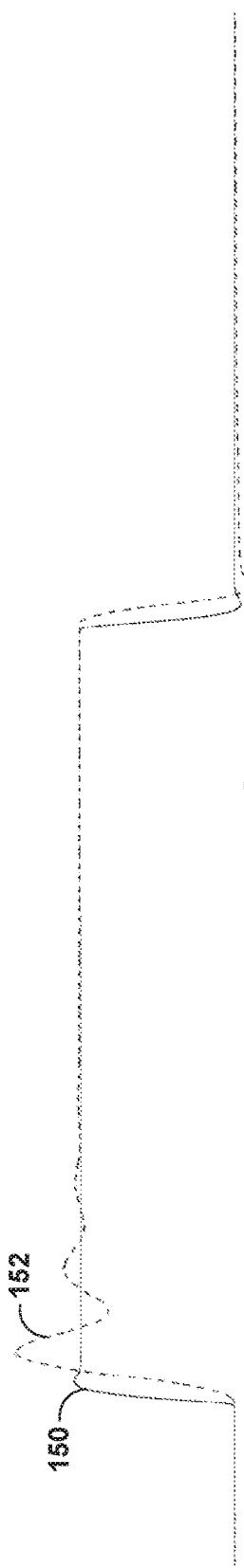
FIGS. 8A-8D are graphs of output current, output voltage, opto-coupler signal, and switching frequency of a resonant mode power converter circuit including a comparator and a ramp generator, in accordance with some examples of this disclosure.
Figure 8B:
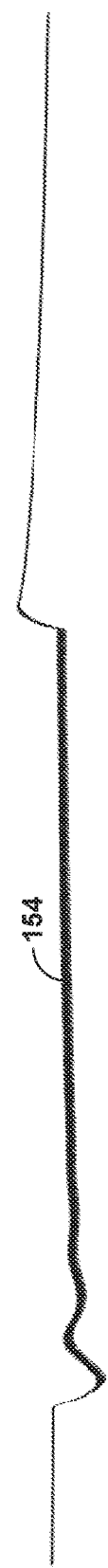
Figure 8C:
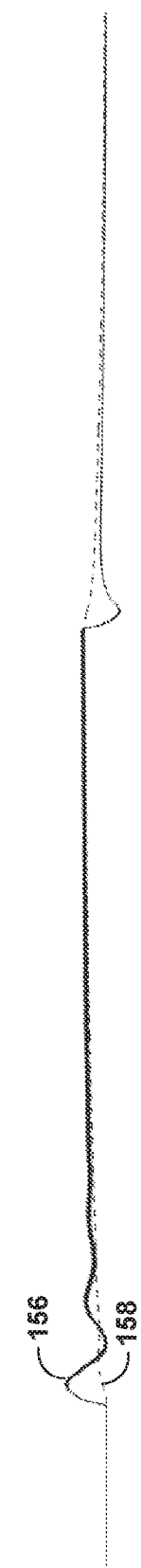
Figure 8D:
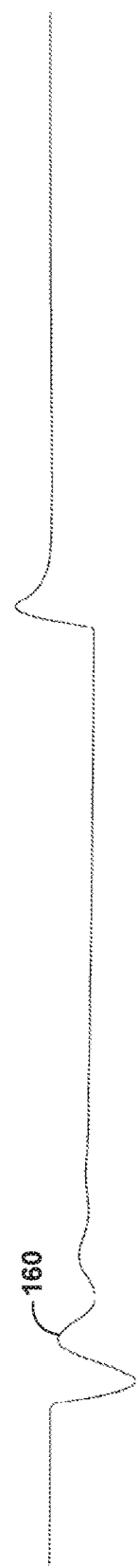

FIG. 6 is a conceptual block and circuit diagram of a controller device for a resonant mode power converter circuit 90 including a comparator 94 and a ramp generator 96, in accordance with some examples of this disclosure. Resonant mode power converter circuit 90 may include many of the same or similar components as resonant mode power converter circuit 2, resonant mode power converter circuit 40, and resonant mode power converter circuit 60 including switches 10A, 10B of half-bridge circuit 9, resonant inductor 14 and resonant capacitor 18 of tank circuit 12, primary side 16A and secondary side 16B of the transformer, diodes 22A, 22B and output capacitor 24 of secondary side 20, and a feedback loop including voltage error amplifier 30 and opto-coupler 32. FIG. 6 depicts controller device 4 as monitoring the resonant current in series with switch 10B, but controller device 4 may also monitor the resonant current in series or in parallel with resonant capacitor 18.

Current mirror 92 may receive a signal from opto-coupler 32 through feedback pin 38. Current mirror 92 may supply mirrored currents to VCO 6 and ramp generator 96. VCO 6 may use the mirrored current as a charge current, and ramp generator 96 may use the mirrored current to charge a ramp signal and/or charge a ramp capacitor.

Comparator 94 of controller device 4 may determine a phase of the resonant current in response to a zero crossing of the resonant current. Comparator 94 may receive as inputs the voltage at sensing pin 46 and the reference voltage. Comparator 94 may output a high voltage or a low voltage based on which input voltage is greater. Thus, comparator 94 may operate as a one-bit analog-to-digital converter.

Ramp generator 96 may start charging a ramp signal such as a voltage across a ramp capacitor based on a control signal from VCO 6. In some examples, the ramp signal may include a counter state in a counter circuit. In some examples, the start signal from VCO 6 may correspond to a turn-off control signal, such as a turn-off control signal delivered by control pin 36A to switch 10A. Ramp generator 96 may cease charging the ramp signal when comparator 94 detects a zero crossing of the resonant current. Ramp generator 96 may switch off the charging current for the ramp signal when ramp generator 96 detects a change in the output signal from comparator 94. Ramp generator 96 may maintain the ramp signal until ramp generator 96 receives a discharge signal from VCO 6. Ramp generator 96 may transmit an indication of the ramp signal to high-pass filter 98 as a phase signal. The phase signal may indicate the level of the ramp signal during the maintaining phase, as shown by reference numeral 120 in FIG. 7C, after switching off the charge current from current mirror 92 and before discharging the ramp signal. Controller device 4 may implement a sample-and-hold circuit to maintain the level of the ramp signal. Comparator 94 and ramp generator 96 are configured to convert a phase relation of the control signals and the resonant current to the phase signal.

High-pass filter 98 may filter the phase signal and generate a filtered signal. High-pass filter 98 may include one or more resistors, capacitors, and/or inductors configured to high-pass filter the phase signal and produce a filtered signal. High-pass filter 98 may include a switched-capacitor filter configured to sample the phase signal from ramp generator 96. Alternatively or additionally, high-pass filter 98 may be configured to receive a sampled signal from a sample-and-hold circuit that holds an indication of the level of the ramp signal. The filtered signal may include a derivative of the phase signal because the filtered signal may represent the difference in the phase signal from a first driving period to a second driving period. For example, if the phase signal for the latest driving period is the same as the phase signal during a previous driving period, high-pass filter 98 may output a filtered signal of zero amplitude to VCO 6. However, if the phase signal is different than the phase signal during a previous driving period, high-pass filter 98 may output a positive or negative filtered signal to VCO 6.

VCO 6 may be configured to adjust the switching frequency of the control signals based on the filtered signal received from high-pass filter 98. It may be desirable for VCO 6 to adjust the switching frequency quickly and with a fine resolution. In some examples, VCO 6 may limit the adjustment for the switching frequency to prevent a large adjustment due to an aberrant change in phase relation.

Controller device 4 may include processing circuitry, which may include any of the elements within controller device 4. In some examples, the processing circuitry of controller device 4 may include VCO 6, current mirror 92, comparator 94, ramp generator 96, and/or high-pass filter 98. The sensing circuitry of controller device 4 may include sensing pin 46, comparator 94, and/or shunt resistor 42. The driver circuitry of controller device 4 may include half-bridge driver circuitry and/or control pins 36A, 36B.

FIGS. 7A-7C are graphs of control signals 110, 112, the voltage 114 at shunt resistor 42, which may relate to the resonant current through a tank circuit 12, and an output of a ramp generator 96, in accordance with some examples of this disclosure. The graphs in FIGS. 7A-7C may correspond to resonant mode power converter circuit 90 in FIG. 6. The horizontal axes of the graphs in FIGS. 7A-7C may represent time. The vertical axes of the graphs in FIG. 7A may represent the voltage of the control signals delivered by control pins 36A, 36B. The vertical axis of the graph in FIG. 7B may represent the voltage at sensing pin 46, which may be a function of the resonant current in tank circuit 12. The vertical axis of the graph in FIG. 7C may represent a ramp signal at ramp generator 96.

As depicted in FIG. 7A, high-side control signal 110 may represent the control signal delivered by control pin 36A to switch 10A. Low-side control signal 112 may represent the control signal delivered by control pin 36B to switch 10B. At time 130, high-side control signal 110 may turn off, causing ramp signal 120 to begin charging. As depicted in FIG. 6, VCO 6 may transmit a signal to ramp generator 96 indicating the turn-off control signal to cause ramp generator 96 to begin charging ramp signal 120. In some examples, the ramp signal may include an analog signal such as a voltage across a ramp capacitor. The ramp signal may also include a digital signal such as a counter state.

Sensing pin 46 may begin monitoring resonant current 114 when switch 10B turns on, allowing resonant current 114 to pass through switch 10B. At time 132, ramp generator 96 may cease charging ramp signal 120 when resonant current 114 crosses a threshold level in FIG. 7B. When low-side control signal 112 turns off, sensing pin 46 may cease monitoring resonant current 114, and the ramp signal may decline to zero. Ramp generator 96 may convert ramp signal 120 to phase signal 121 and transmit phase signal 121 to high-pass filter 98.

At time 134, high-side control signal 110 may turn off, causing the ramp signal to begin charging. When the low-side control signal 112 turns on, sensing pin 46 may begin monitoring the resonant current. FIGS. 7A-7C depict three scenarios: a first scenario representing a shorter phase lag between the control signals and the resonant current, the second scenario representing no difference in the phase lag, and the third scenario representing a longer phase lag. For the first scenario, resonant current 116 passes the threshold level at time 136A, which may be sooner than resonant current 114 passed the threshold level during the previous driving period. When resonant current 116 passes the threshold level at time 136A, ramp signal 122 may cease charging. Ramp signal 122 may include a lower amplitude than ramp signal 120 because ramp signal 122 may include a shorter charging time than ramp signal 120.

Ramp generator 96 may convert the ramp signal 122 to a phase signal and transmit the phase signal to high-pass filter 98. High-pass filter 98 may high-pass filter the phase signal into a filtered signal with a negative or low voltage level. The filtered signal may include a derivative of the phase signal in that the filtered signal is based on the difference of the phase signal from one driving period to the next driving period. VCO 6 may receive the filtered signal and increase the switching frequency based on the lower voltage of the filtered signal, as compared to the filtered signal of ramp signal 120. FIG. 7A depicts the increased switching frequency and consequently shorter enabling control signals. In an alternative, high pass filter 98 may have an inverting response, leading to a high level of the filtered signal in the given scenario, and VCO 6 may increase the frequency based on the higher voltage of the filtered signal. VCO 6 may adjust the switching frequency based on the filtered signal from high-pass filter 98. VCO 6 may maintain the frequency adjustment as long as the filtered signal maintains a given level. When the filtered signal returns to zero due to zero change in the phase relation, the switching frequency may return to an original or previous value that may be based on the feedback signal received at feedback pin 38.

For the second scenario, the resonant current passes the threshold level at time 136B, at approximately the same phase lag as resonant current 114. Thus, the ramp signal may include a similar amplitude to the amplitude of ramp signal 120 because both ramp signals may include a similar charging times. Ramp generator 96 may convert the ramp signal to a phase signal and transmit the phase signal to high-pass filter 98. High-pass filter 98 may high-pass filter the phase signal into a filtered signal with a near-zero voltage level. VCO 6 may receive the filtered signal and not change the switching frequency based on the similar or same voltage of the filtered signal, as compared to the filtered signal of ramp signal 120. FIG. 7A depicts the unchanged switching frequency and the enabling control signals for the second scenario.

For the third scenario, the resonant current passes the threshold level at time 136C, which may be later than the phase lag for resonant current 114. Thus, ramp signal 124 may include a higher amplitude than the amplitude of ramp signal 120 because ramp signal may include a longer charging times, as compared to ramp signal 120. Ramp generator 96 may convert ramp signal 124 to a phase signal and transmit the phase signal to high-pass filter 98. High-pass filter 98 may high-pass filter the phase signal into a filtered signal with a positive or high voltage level. VCO 6 may receive the filtered signal and decrease the switching frequency based on the higher voltage of the filtered signal, as compared to the filtered signal of ramp signal 120. FIG. 7A depicts the decreased switching frequency and consequently longer enabling control signals.

FIGS. 8A-8D are graphs of output current 150, rectified current 152, output voltage 154, opto-coupler 156, and switching frequency 160 of another resonant mode power converter circuit. Output current 150 may have a similar track, as compared to output current 180 in FIG. 9A. Rectified current 152, output voltage 154, signals 156, 158, and switching frequency 160 may include more fluctuations than rectified current 182, output voltage 184, signals 186, 188, and switching frequency 190 in FIGS. 9A-9D. Switching frequency 160 fluctuates more than switching frequency 190 and includes several overshoots before leveling off at the steady-state condition.

Figure 9A:
FIGS. 9A-9D are graphs of output current, output voltage, opto-coupler signal, and switching frequency of another resonant mode power converter circuit.
Figure 9B:
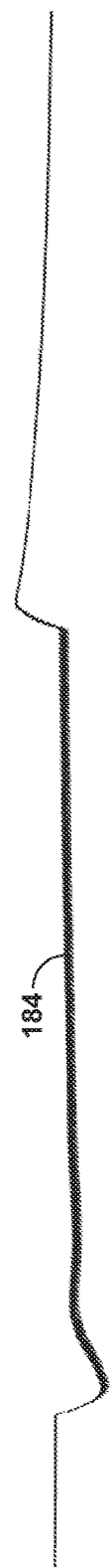
Figure 9C:
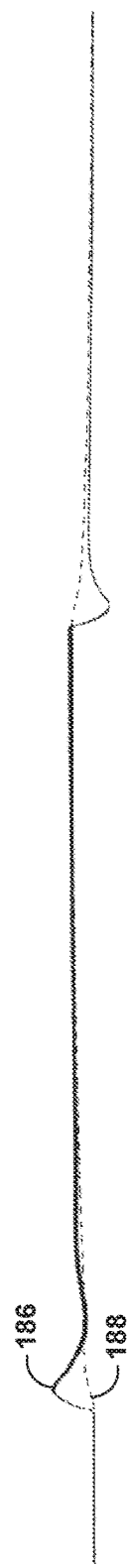
Figure 9D:

FIGS. 9A-9D are graphs of output current 180, rectified current 182, output voltage 184, opto-coupler signal 186, and switching frequency 190 of a resonant mode power converter circuit 90 including a comparator 94 and a ramp generator 98, in accordance with some examples of this disclosure. Output current 180 may represent the current flowing through output node 26 to an output load. Rectified current 182 may represent the current flowing through rectifier diodes 22A, 22B to output capacitor 24. Output capacitor 24 may remove some or all of the ripple from rectified current. FIG. 9A shows the response of output current 180 and rectified current 182 to a change in the output load.

Output voltage 184 may represent the voltage at output node 26, as compared to the reference voltage. Output voltage 184 may also represent the voltage across output capacitor 24. Signal 186 may represent the signal from opto-coupler 32, which is an image of the output voltage 184 filtered by a PID (proportional-integrating-differentiating) compensation filter. Signal 188 may represent the integrating part from the compensation filter. Switching frequency 190 may represent the switching frequency determined by the processing circuitry of controller device 4. Switching frequency 190 may overshoot the steady-state condition once before leveling off. In contrast, switching frequency 160 of FIG. 8D overshoots the steady-state condition several times before leveling off at the steady-state frequency.

Figure 10:
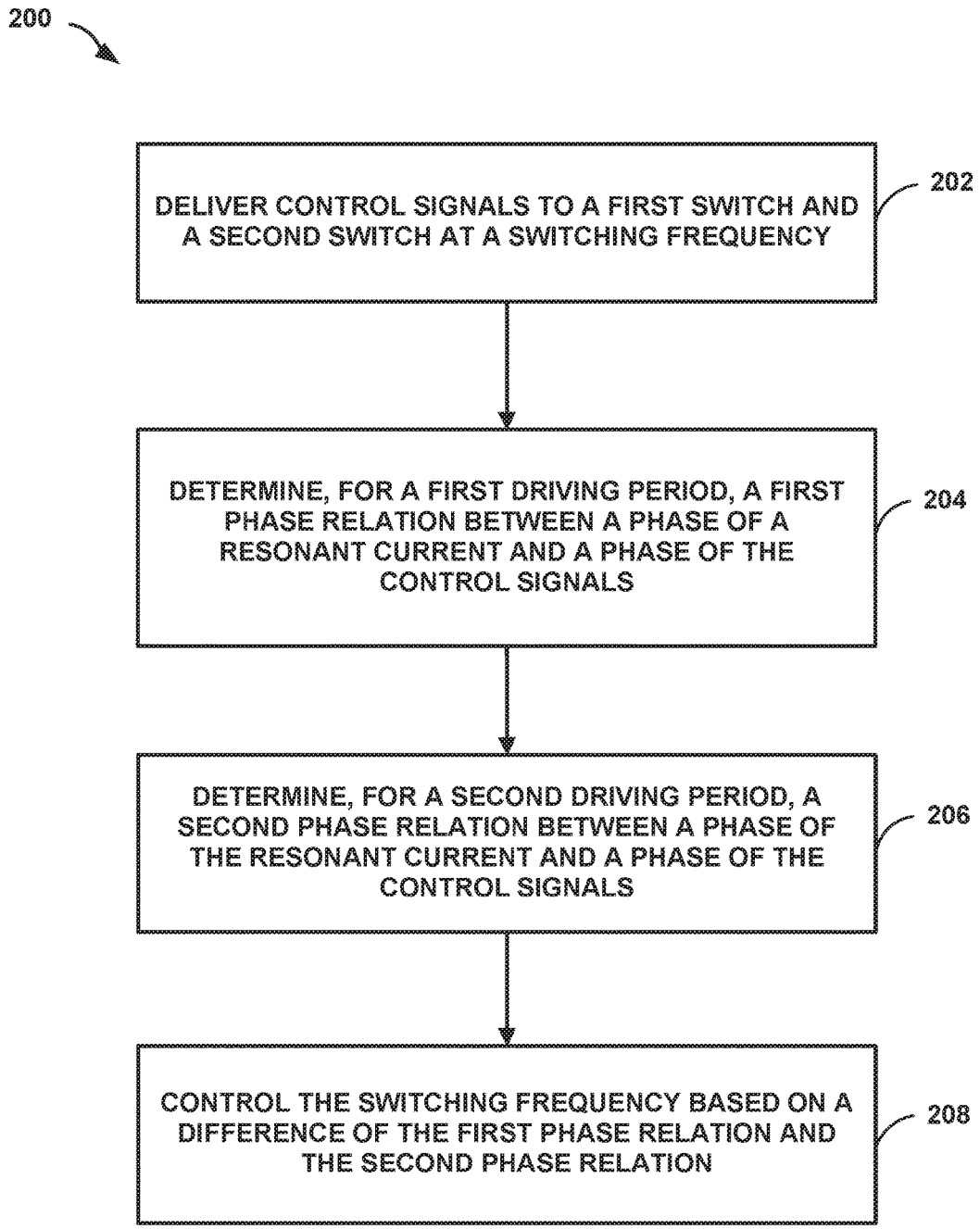
FIG. 10 is a flowchart illustrating a technique for controlling a switching frequency of a first switch and a second switch of a resonant mode power converter circuit, in accordance with some examples of this disclosure.

FIG. 10 is a flowchart illustrating a technique 200 for controlling a switching frequency of a first switch 10A and a second switch 10B of a resonant mode power converter circuit 90, in accordance with some examples of this disclosure. Technique 200 is described with reference to controller device 4 in FIG. 6, although other components, such as controller device 4 in FIGS. 1, 2, and 4, may exemplify similar techniques.

The technique of FIG. 10 includes delivering control signals to switches 10A, 10B at a switching frequency (202). Half-bridge driver circuitry 8 may generate control signals at a switching frequency based on an oscillating signal received from VCO 6. Half-bridge driver circuitry 8 may deliver the control signals to switches 10A, 10B through control pins 36A, 36B. The control signals may include enabling periods to cause one of switches 10A, 10B to conduct electricity. Control pins 36A, 36B may deliver the control signals to the control terminals of switches 10A, 10B.

The technique of FIG. 10 also includes determining, for a first driving period, a first phase relation between a phase of a resonant current and a phase of the control signals (204). Controller device 4 may include ramp generator 96 that begins charging a ramp signal based on a signal from VCO 6 indicating the phase of the control signals. Ramp generator 96 may cease charging the ramp signal based on the resonant current passing a threshold level. Comparator 94 may determine when the resonant current passes the threshold level.

The technique of FIG. 10 also includes determining, for a second driving period, a second phase relation between a phase of the resonant current and a phase of the control signals (206). The second driving period may occur a half switching cycle, a full switching cycle, or two or more switching cycles after the first driving period. Controller device 4 may determine the phase relation by the amplitude of the ramp signal after ramp generator 96 ceases charging the ramp signal.

The technique of FIG. 10 also includes controlling the switching frequency based on a difference of the first phase relation and the second phase relation (208). Controller device 4 may determine the difference by high-pass filtering the ramp signals from the first driving period and the second driving period. High-pass filter 98 may generate a filtered signal that indicates whether the phase relations are increasing, decreasing, or staying the same. VCO 6 may adjust the switching frequency based on the switching frequency. The adjustment of the switching frequency may be proportional to the filtered signal from high-pass filter 98 and last only as long as the filtered signal from high-pass filter 98 maintains a given level, which may indicate a change in the phase relation.

Figure 11:
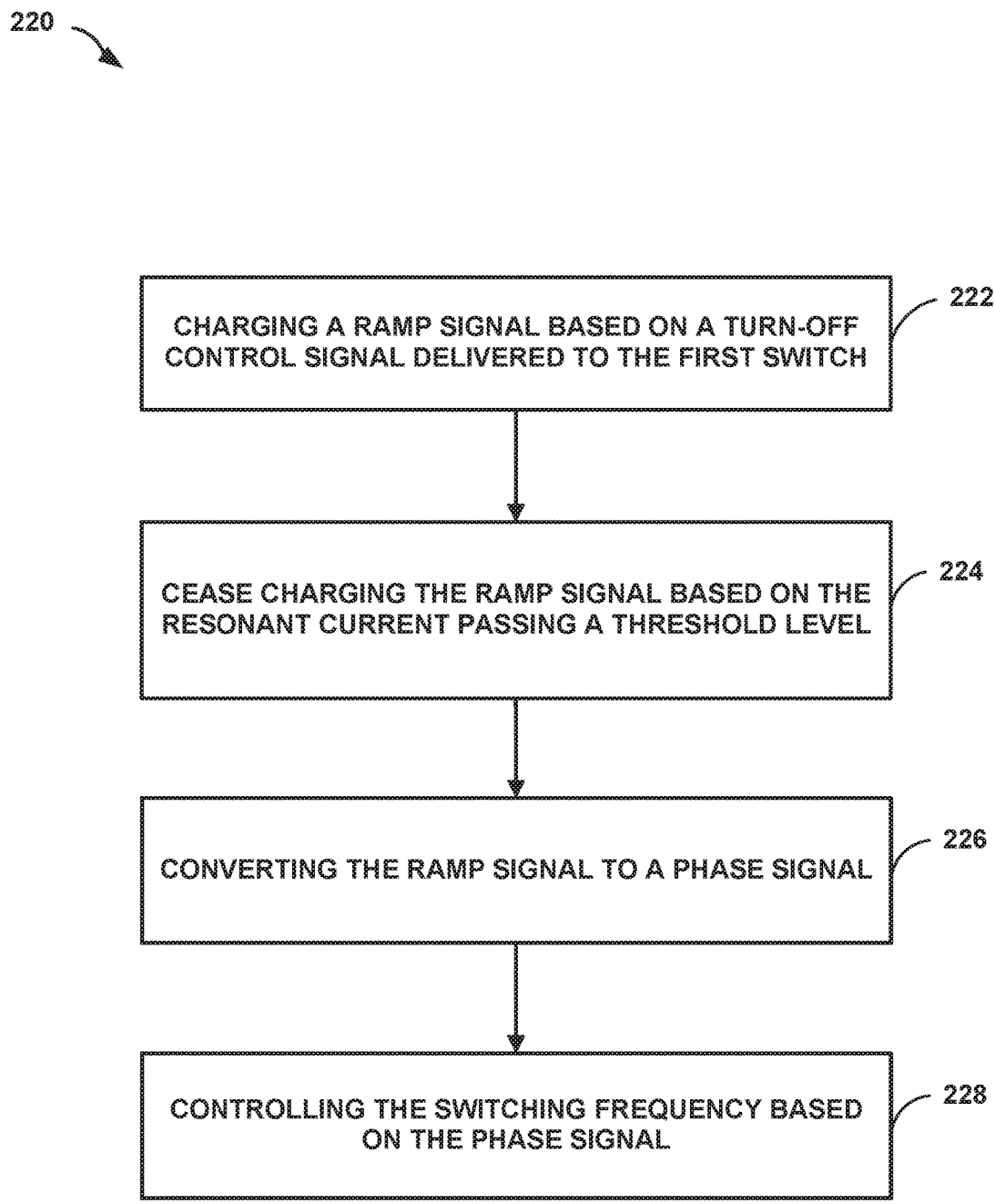
FIG. 11 is a flowchart illustrating a technique for charging a ramp capacitor based on a turn-off time of a switch and a zero crossing of a current, in accordance with some examples of this disclosure.

FIG. 11 is a flowchart illustrating a technique 220 for charging a ramp capacitor based on a turn-off time of a switch and a zero crossing of a current, in accordance with some examples of this disclosure. Technique 220 is described with reference to controller device 4 in FIG. 6, although other types of devices or controllers, such as controller device 4 in FIGS. 1, 2, and 4 or other types of controller devices may implement technique 220.

The technique of FIG. 11 includes charging a ramp signal based on a turn-off control signal delivered to switch 10A (222). VCO 6 may cause ramp generator 96 to begin charging the ramp signal at the control signal at control pin 36A turns off. The control signal may close a switch that allows current mirror 92 to charge a ramp capacitor or increase a counter.

The technique of FIG. 11 also includes ceasing charging the ramp signal based on the resonant current passing a threshold level (224). Ramp generator 96 may stop charging the ramp signal based on a signal from comparator 94 indicating that the resonant current has passed the threshold level. Comparator 94 may send the signal when the voltage at sensing pin 46 crosses the reference voltage.

The technique of FIG. 11 also includes converting the ramp signal to a phase signal (226). Ramp generator 96 may convert the ramp signal to the phase signal and transmit the phase signal to high-pass filter 98. In some examples, ramp generator 96 may include a sample-and-hold circuit for converting the ramp signal to the phase signal. The phase signal may indicate the amplitude of the ramp signal after ramp generator 96 finishes charging the ramp signal. High-pass filter 98 may convert the phase signal to a filtered signal that indicates the difference in phase relation or phase lag between two driving periods.

The technique of FIG. 11 also includes controlling the switching frequency based on the phase signal (228). VCO 6 may adjust the switching frequency based on the amplitude of the filtered signal from high-pass filter 98. For example, VCO 6 may increase the switching frequency if the phase lag has decreased from a first driving period to a second driving period in order to decrease the output voltage.

The techniques of this disclosure may be implemented in a device or article of manufacture comprising a computer-readable storage medium. The term "processing circuitry," as used herein may refer to any of the foregoing structure or any other structure suitable for processing program code and/or data or otherwise implementing the techniques described herein. Elements of controller device 4 and the processing circuitry of controller device 4 may be implemented in any of a variety of types of solid state circuit elements, such as CPUs, CPU cores, GPUs, digital signal processors (DSPs), application-specific integrated circuits (ASICs), a mixed-signal integrated circuits, field programmable gate arrays (FPGAs), microcontrollers, programmable logic controllers (PLCs), programmable logic device (PLDs), complex PLDs (CPLDs), a system on a chip (SoC), any subsection of any of the above, an interconnected or distributed combination of any of the above, or any other integrated or discrete logic circuitry, or any other type of component or one or more components capable of being configured in accordance with any of the examples disclosed herein. Processing circuitry may also include analog components arranged in a mixed-signal IC.

Controller device 4 and the processing circuitry of controller device 4 may include memory. One or more memory devices of the memory may include any volatile or non-volatile media, such as a RAM, ROM, non-volatile RAM (NVRAM), electrically erasable programmable ROM (EEPROM), flash memory, and the like. One or more memory devices of the memory may store computer readable instructions that, when executed by the processing circuitry, cause the processing circuitry to implement the techniques attributed herein to the processing circuitry.

Elements of controller device 4 and/or the processing circuitry of controller device 4 may be programmed with various forms of software. The processing circuitry may be implemented at least in part as, or include, one or more executable applications, application modules, libraries, classes, methods, objects, routines, subroutines, firmware, and/or embedded code, for example. The processing circuitry may be configured to receive voltage signals, determine switching frequencies, and deliver control signals.

The techniques of this disclosure may be implemented in a wide variety of computing devices. Any components, modules or units have been described to emphasize functional aspects and does not necessarily require realization by different hardware units. The techniques described herein may be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset.

The following numbered examples demonstrate one or more aspects of the disclosure.

Example 1

A method for controlling a first switch and a second switch of a resonant mode power converter circuit, the method comprising

Example 2

The method of example 1, wherein determining the first phase relation between a phase of the resonant current and a phase of the control signals comprises detecting the resonant current passing a threshold level.

Example 3

The method of example 2, wherein the threshold level comprises a current of approximately zero amperes.

Example 4

The method of examples 1-3 or any combination thereof, wherein determining the first phase relation between a phase of the resonant current and a phase of the control signals comprises determining a first turn-off control signal delivered to the first switch or the second switch; and determining the second phase relation between a phase of the resonant current and a phase of the control signals comprises determining a second turn-off control signal delivered to the first switch or the second switch.

Example 5

The method of examples 1-4 or any combination thereof, further comprising converting the first phase relation or the second phase relation to a phase signal.

Example 6

The method of example 5, further comprising controlling the switching frequency based on a derivative of the phase signal.

Example 7

The method of examples 5-6 or any combination thereof, further comprising high-pass filtering the phase signal into a filtered signal; and controlling the switching frequency based on the filtered signal.

Example 8

The method of examples 5-7 or any combination thereof, wherein converting the first phase relation or the second phase relation to a phase signal comprises charging a ramp signal based on a turn-off control signal delivered to the first switch or the second switch; ceasing charging the ramp signal based on the resonant current passing a threshold level; and converting the ramp signal to the phase signal.

Example 9

The method of example 8, wherein the ramp signal comprises a voltage at a ramp capacitor configured to be charged by a current.

Example 10

The method of examples 8-9 or any combination thereof, wherein the ramp signal comprises a counter state.

Example 11

The method of examples 1-10 or any combination thereof, wherein determining the first phase relation between a phase of the resonant current and a phase of the control signals comprises monitoring the resonant current in series with the first switch or the second switch.

Example 12

The method of examples 1-11 or any combination thereof, wherein determining the first phase relation between a phase of the resonant current and a phase of the control signals comprises monitoring the resonant current in series or in parallel with a resonant capacitor of the resonant mode power converter circuit.

Example 13

A controller device for controlling a first switch and a second switch of a resonant mode power converter circuit, the controller device comprising at least two control pins configured to deliver control signals to the first switch and the second switch at a switching frequency; and a sensing pin configured to sense a resonant current in the resonant mode power converter circuit. The controller device further includes processing circuitry configured to determine, for a first driving period, a first phase relation between a phase of the resonant current and a phase of the control signals, determine, for a second driving period, a second phase relation between a phase of the resonant current and a phase of the control signals, and control the switching frequency based on a difference of the first phase relation and the second phase relation.

Example 14

The controller device of example 13, wherein the processing circuitry is configured to determine the first phase relation between a phase of the resonant current and a phase of the control signals by at least detecting the resonant current passing a threshold current of approximately zero amperes.

Example 15

The controller device of examples 13-14 or any combination thereof, wherein the processing circuitry is configured to determine the first phase relation between a phase of the resonant current and a phase of the control signals by at least determining a first turn-off control signal delivered to the first switch or the second switch; and determine the second phase relation between a phase of the resonant current and a phase of the control signals by at least determining a second turn-off control signal delivered to the first switch or the second switch.

Example 16

The controller device of examples 13-15 or any combination thereof, wherein the processing circuitry is further configured to convert the first phase relation or the second phase relation to a phase signal; and control the switching frequency based on a derivative of the phase signal.

Example 17

The controller device of examples 13-16 or any combination thereof, wherein the processing circuitry is further configured to convert the first phase relation or the second phase relation to a phase signal; high-pass filter the phase signal into a filtered signal; and control the switching frequency based on the filtered signal.

Example 18

A resonant mode power converter circuit comprising a half-bridge circuit including a first switch, a second switch, and an output node electrically connected to a load terminal of the first switch and a load terminal of the second switch; an LLC circuit including an inductor electrically connected to the output node of the half-bridge circuit, a primary side of a transformer electrically connected to the inductor, and a resonant capacitor electrically connected to the primary side of the transformer; and an output capacitor arranged to receive an output voltage from a rectifier electrically connected to a secondary side of the transformer. The resonant mode power converter circuit further includes a controller device including driver circuitry configured to deliver control signals to the first switch and the second switch at a switching frequency, and processing circuitry configured to determine, for a first driving period, a first phase relation between a phase of a resonant current in the LLC circuit and a phase of the control signals, determine, for a second driving period, a second phase relation between a phase of the resonant current and a phase of the control signals, and control the switching frequency based on a difference of the first phase relation and the second phase relation.

Example 19

The resonant mode power converter circuit of example 18, wherein the processing circuitry is configured to determine the first phase relation between a phase of the resonant current and a phase of the control signals by at least detecting the resonant current passing a threshold current of approximately zero amperes, and determining a first turn-off control signal delivered to the first switch or the second switch; and the processing circuitry is configured to determine the second phase relation between a phase of the resonant current and a phase of the control signals by at least detecting the resonant current passing a threshold current of approximately zero amperes, and determining a second turn-off control signal delivered to the first switch or the second switch.

Example 20

The resonant mode power converter circuit of examples 18-19 or any combination thereof, wherein the processing circuitry is further configured to convert the first phase relation or the second phase relation to a phase signal; high-pass filter the phase signal into a filtered signal; and control the switching frequency based on the filtered signal.

Various examples of the disclosure have been described. Any combination of the described systems, operations, or functions is contemplated. These and other examples are within the scope of the following claims.

What is claimed is:

1. A method of controlling a first switch and a second switch of a half-bridge circuit of a resonant mode power converter circuit, the method comprising:
   delivering control signals to the first switch and the second switch at a switching frequency;
   determining, for a first driving period, a first phase relation between a phase of a resonant current in the resonant mode power converter circuit and a phase of the control signals;
   determining, for a second driving period, a second phase relation between the phase of the resonant current and the phase of the control signals, wherein the first driving period and the second driving period are driving periods for the half-bridge circuit; and
   controlling the switching frequency based on a difference of the first phase relation and the second phase relation.

2. The method of claim 1, wherein determining the first phase relation between the phase of the resonant current and the phase of the control signals comprises detecting the resonant current passing a threshold level.

3. The method of claim 2, wherein the threshold level comprises a current of approximately zero amperes.

4. The method of claim 1, wherein:
   determining the first phase relation between the phase of the resonant current and the phase of the control signals comprises determining a first turn-off control signal delivered to the first switch or the second switch; and
   determining the second phase relation between the phase of the resonant current and the phase of the control signals comprises determining a second turn-off control signal delivered to the first switch or the second switch.

5. The method of claim 1, further comprising converting the first phase relation or the second phase relation to a phase signal.

6. The method of claim 5, further comprising controlling the switching frequency based on a derivative of the phase signal.

7. The method of claim 5, further comprising:
   high-pass filtering the phase signal into a filtered signal; and
   controlling the switching frequency based on the filtered signal.

8. The method of claim 5, wherein converting the first phase relation or the second phase relation to the phase signal comprises:
   charging a ramp signal based on a turn-off control signal delivered to the first switch or the second switch;
   ceasing charging the ramp signal based on the resonant current passing a threshold level; and
   converting the ramp signal to the phase signal.

9. The method of claim 8, wherein the ramp signal comprises a voltage at a ramp capacitor configured to be charged by a current.

10. The method of claim 8, wherein the ramp signal comprises a counter state.

11. The method of claim 1, wherein determining the first phase relation between the phase of the resonant current and the phase of the control signals comprises monitoring the resonant current in series with the first switch or the second switch.

12. The method of claim 1, wherein determining the first phase relation between the phase of the resonant current and the phase of the control signals comprises monitoring the resonant current in series or in parallel with a resonant capacitor of the resonant mode power converter circuit.

13. A controller device for controlling a first switch and a second switch of a half-bridge circuit of a resonant mode power converter circuit, the controller device comprising:
at least two control pins configured to deliver control signals to the first switch and the second switch at a switching frequency;
a sensing pin configured to sense a resonant current in the resonant mode power converter circuit; and
processing circuitry configured to:
determine, for a first driving period, a first phase relation between a phase of the resonant current and a phase of the control signals,
determine, for a second driving period, a second phase relation between the phase of the resonant current and the phase of the control signals, wherein the first driving period and the second driving period are driving periods for the half-bridge circuit, and
control the switching frequency based on a difference of the first phase relation and the second phase relation.

14. The controller device of claim 13, wherein the processing circuitry is configured to determine the first phase relation between the phase of the resonant current and the phase of the control signals by at least detecting the resonant current passing a threshold current of approximately zero amperes.

15. The controller device of claim 13, wherein the processing circuitry is configured to:
determine the first phase relation between the phase of the resonant current and the phase of the control signals by at least determining a first turn-off control signal delivered to the first switch or the second switch; and
determine the second phase relation between the phase of the resonant current and the phase of the control signals by at least determining a second turn-off control signal delivered to the first switch or the second switch.

16. The controller device of claim 13, wherein the processing circuitry is further configured to:
convert the first phase relation or the second phase relation to a phase signal; and
control the switching frequency based on a derivative of the phase signal.

17. The controller device of claim 13, wherein the processing circuitry is further configured to:
convert the first phase relation or the second phase relation to a phase signal;
high-pass filter the phase signal into a filtered signal; and
control the switching frequency based on the filtered signal.

18. A resonant mode power converter circuit comprising:
a half-bridge circuit including a first switch, a second switch, and an output node electrically connected to a load terminal of the first switch and a load terminal of the second switch;
an LLC circuit including an inductor electrically connected to the output node of the half-bridge circuit, a primary side of a transformer electrically connected to the inductor, and a resonant capacitor electrically connected to the primary side of the transformer;
an output capacitor arranged to receive an output voltage from a rectifier configured to rectify a voltage signal from a secondary side of the transformer; and
a controller device including:
driver circuitry configured to deliver control signals to the first switch and the second switch at a switching frequency, and
processing circuitry configured to:
determine, for a first driving period, a first phase relation between a phase of a resonant current in the LLC circuit and a phase of the control signals,
determine, for a second driving period, a second phase relation between the phase of the resonant current and the phase of the control signals, and
control the switching frequency based on a difference of the first phase relation and the second phase relation.

19. The resonant mode power converter circuit of claim 18, wherein:
the processing circuitry is configured to determine the first phase relation between the phase of the resonant current and the phase of the control signals by at least:
detecting the resonant current passing a threshold current of approximately zero amperes, and
determining a first turn-off control signal delivered to the first switch or the second switch; and
the processing circuitry is configured to determine the second phase relation between the phase of the resonant current and the phase of the control signals by at least:
detecting the resonant current passing a threshold current of approximately zero amperes, and
determining a second turn-off control signal delivered to the first switch or the second switch.

20. The resonant mode power converter circuit of claim 18, wherein the processing circuitry is further configured to:
convert the first phase relation or the second phase relation to a phase signal;
high-pass filter the phase signal into a filtered signal; and
control the switching frequency based on the filtered signal.

* * * * *